(12) United States Patent
Sadkowski et al.

(10) Patent No.: US 9,128,490 B2
(45) Date of Patent: Sep. 8, 2015

(54) BUTTERFLY VALVE FOR ARRANGEMENT IN A FLOW DUCT OF AN AIR-CONDITIONING INSTALLATION

(71) Applicant: TROX GmbH, Neukirchen-Vluyn (DE)

(72) Inventors: Manfred Sadkowski, Geldern (DE); Heike Schicks, Krefeld (DE)

(73) Assignee: TROX GmbH, Neukirchen-Vluyn (DE)

( * ) Notice: Subject to any disclaimer, the term of this patent is extended or adjusted under 35 U.S.C. 154(b) by 301 days.

(21) Appl. No.: 13/904,516

(22) Filed: May 29, 2013

(65) Prior Publication Data
US 2013/0319545 A1 Dec. 5, 2013

(30) Foreign Application Priority Data

May 31, 2012 (EP) .................................... 12170196
Sep. 3, 2012 (EP) .................................... 12182807

(51) Int. Cl.
| | | |
|---|---|---|
| *F16K 31/02* | (2006.01) | |
| *F16K 1/22* | (2006.01) | |
| *G05D 7/06* | (2006.01) | |
| *F24F 13/14* | (2006.01) | |
| *F24F 11/04* | (2006.01) | |

(Continued)

(52) U.S. Cl.
CPC .......... *G05D 7/0617* (2013.01); *B60H 1/00678* (2013.01); *B60H 1/00792* (2013.01); *F24F 11/043* (2013.01); *F24F 13/14* (2013.01); *G01F 1/26* (2013.01); *G01F 1/363* (2013.01); *G01F 1/40* (2013.01); *G01F 7/005* (2013.01); *F24F 2011/0042* (2013.01); *Y10T 137/7759* (2015.04)

(58) Field of Classification Search
CPC ...... G05D 7/0617; F24F 13/14; F24F 11/043; F24F 2011/0042; G01F 1/26; G01F 1/363; G01F 1/40; G01F 7/005; B60H 1/00678; B60H 1/00792; Y10T 137/7759; Y10T 137/776; Y10T 137/7761; F16K 1/22; F16K 1/221; F16K 1/222
USPC ...................... 137/487, 487.5, 15.25, 315.22; 251/305, 366
See application file for complete search history.

(56) References Cited

U.S. PATENT DOCUMENTS

| 1,681,762 | A | * | 8/1928 | Connet ............................ 73/203 |
| 3,680,833 | A | * | 8/1972 | McNeely, Jr. ................. 251/283 |

(Continued)

FOREIGN PATENT DOCUMENTS

| DE | 20217571 U1 | 1/2003 |
| DE | 10207621 A1 | 9/2003 |

(Continued)

*Primary Examiner* — Craig Schneider
*Assistant Examiner* — Minh Le
(74) *Attorney, Agent, or Firm* — Berenato & White, LLC (57) ABSTRACT

The invention is a butterfly valve for a flow duct of an air-conditioning installation. The butterfly valve comprises two butterfly valve faces and is mounted for rotation about an axis. A device with at least two measurement points for determining the volume flow rate of a gaseous medium flowing in the flow duct is provided. In order to specify a butterfly valve, for example for a volume flow rate controller, which can determine a high differential pressure, even at very low volume flow rates, the butterfly valve comprises at least one hollow chamber on each of its two butterfly valve faces. Each hollow chamber has at least one recess, preferably with a multiplicity of recesses formed in the manner of a perforation. One measurement point is associated with one hollow chamber and the other measurement point is associated with the other hollow chamber.

28 Claims, 7 Drawing Sheets

(51) Int. Cl.
  *G01F 1/26* (2006.01)
  *G01F 1/36* (2006.01)
  *G01F 1/40* (2006.01)
  *G01F 7/00* (2006.01)
  *B60H 1/00* (2006.01)
  *F24F 11/00* (2006.01)

(56) References Cited

U.S. PATENT DOCUMENTS

| | | | |
|---|---|---|---|
| 4,406,161 A | * | 9/1983 | Locke et al. ............... 73/114.33 |
| 4,444,060 A | * | 4/1984 | Yamamoto ................ 73/861.66 |
| 4,969,485 A | * | 11/1990 | Ball et al. ................. 137/599.18 |
| RE33,649 E | * | 7/1991 | Kawai .......................... 137/554 |
| 5,067,506 A | * | 11/1991 | Ball et al. ......................... 137/1 |
| 5,195,719 A | * | 3/1993 | Ball et al. ......................... 251/56 |
| 5,379,792 A | * | 1/1995 | Van Becelaere ................ 137/12 |
| 5,609,183 A | * | 3/1997 | Parker .......................... 137/554 |
| 5,730,652 A | * | 3/1998 | Van Becelaere .............. 454/335 |
| 6,758,458 B2 | * | 7/2004 | Ando et al. .................... 251/305 |
| 7,490,627 B2 | * | 2/2009 | Hourai .................... 137/625.31 |

FOREIGN PATENT DOCUMENTS

| | | |
|---|---|---|
| DE | 102007019231 B3 | 7/2008 |
| WO | 0175374 A1 | 10/2001 |

* cited by examiner

BUTTERFLY VALVE FOR ARRANGEMENT IN A FLOW DUCT OF AN AIR-CONDITIONING INSTALLATION

CROSS-REFERENCE TO RELATED APPLICATIONS AND CLAIM TO PRIORITY

This application is related to application Ser. No. 12170196.5 filed May 31, 2012 and application Ser. No. 12182807.3 filed Sep. 3, 2012, each in the European Patent Office, the disclosures of which are incorporated by reference and to which priority is claimed.

FIELD OF THE INVENTION

The invention relates to a butterfly valve for arrangement in a flow duct of an air-conditioning installation, the butterfly valve comprising two butterfly valve faces and being mounted rotatably about a swivel axis, and a device with at least two measurement points for determining the volume flow rate of a gaseous medium flowing in the flow duct being provided.

BACKGROUND OF THE INVENTION

Corresponding butterfly valves are used for example in volume flow rate controllers, which for example operate in a mechanically autonomous manner or comprise a control unit consisting of a transmitter, drive and controller. Here, the volume flow rate is normally determined via separate back-up elements. A static, dynamic or total pressure difference is tapped at these back-up elements and should have the best possible proportionality to the volume flow rate. Generally however, there is the problem that, with small volume flow rates, there is a high measurement inaccuracy in percentage. This is primarily due to the fact that there is a high spread of the differential pressure between $V_{max}$ and $V_{min}$ at the back-up elements, and the accuracy of the measurement devices is often determined by the maximum value.

SUMMARY OF THE INVENTION

The object of the invention is to specify a butterfly valve, for example for a volume flow rate controller, which can determine a high differential pressure even with very low volume flow rates and therefore enables sufficient control accuracy.

This object is achieved in that the butterfly valve comprises at least one hollow chamber on each of its two butterfly valve faces, each hollow chamber being provided with at least one recess, preferably with a multiplicity of recesses formed in the manner of a perforation, and one measurement point being associated with one hollow chamber and the other measurement point being associated with the other hollow chamber.

The two hollow chambers may have an identical volume. It is also quite possible however for the hollow chamber of one butterfly valve face to be larger than the hollow chamber of the other butterfly valve face.

Depending on the angular position of the butterfly valve, the differential pressure can be averaged over the entire cross section of the flow duct. Depending on the angular position of the butterfly valve, there is a corresponding differential pressure. Due to the embodiment according to the invention, high signals that are to be easily evaluated by the transmitter are measured at the butterfly valve, even with large throttle positions and therefore even with low duct velocities. Due to the embodiment according to the invention, good differential pressure signals can also be produced with low throttle positions, that is to say with high duct velocities.

Each measurement point is normally connected via a pressure line to a transmitter. The transmitter is connected to a controller and to a drive.

The cross section of the flow duct can be formed arbitrarily. For example, it can be round or angular. Depending on the arrangement of the recess(es), the pressure is tapped over the entire surface of the hollow chamber or only over a sub-area. For example, the surfaces can be pierced, slitted or perforated. The recesses are preferably distributed uniformly over the entire face of each hollow chamber.

If the recesses extend over the entire surface of a hollow chamber, a good level of insensitivity with respect to unfavourable onflow conditions during standard operation is produced as a result of the large surface for differential pressure tapping. Additional pressure losses, for example as a result of back-up elements as used in the prior art, are avoided.

The butterfly valve according to the invention is therefore suitable both for very low and also for high air velocities in the flow duct. This is also true in the event of unfavourable onflow conditions.

In its closed position, the butterfly valve may comprise a peripheral gap or may be closed tightly with respect to the flow duct. The butterfly valve may comprise a peripheral seal in the edge region if a complete seal with respect to the flow duct is desired in the closed position.

With use of the butterfly valve in a volume flow rate controller, the butterfly valve is normally located in its closed position at an angle of approximately 70° in relation to the centre axis of the flow duct. In this case, with a round flow duct, the butterfly valve has an approximately oval shape.

In the closed position, the butterfly valve is preferably located at an angle of 90° in relation to the centre axis of the flow duct.

In the open position, the butterfly valve may be oriented parallel to the flow direction. However, embodiments in which the butterfly valve in its open position is inclined with respect to the centre axis of the flow duct are also conceivable. In this case, the butterfly valve is not oriented parallel to the flow direction when in the open position.

At least one of the recesses located in the onflow-side hollow chamber when the butterfly valve is in the closed position can be arranged in the region of the onflow-side hollow chamber forming the onflow-side end face when the butterfly valve is in the open position. At least one of the recesses located in the flow-off-side hollow chamber when the butterfly valve is in the closed position can also be arranged in the region of the flow-off-side hollow chamber forming the flow-off-side end face when the butterfly valve is in the open position.

It is advantageous if all recesses located in the onflow-side hollow chamber when the butterfly valve is in the closed position are arranged in a sub-region of the region of the hollow chamber forming the onflow-side end face when the butterfly valve is in the open position, said sub-region, based on the cross section of the flow duct and as viewed in the flow direction, being arranged before the highest point of the course of the contour of the hollow chamber when the butterfly valve is in the open position. Here, the cross section of the flow duct is oriented at right angles to the flow direction.

It is also advantageous if all recesses located in the flow-off-side hollow chamber when the butterfly valve is in the closed position are arranged in a sub-region of the region of the hollow chamber forming the flow-off-side end face when the butterfly valve is in the open position, said sub-region, based on the cross section of the flow duct and as viewed in the flow direction, being arranged after the lowest point of the course of the contour of the hollow chamber when the butterfly valve is in the open position.

At least one hollow chamber may extend over the entire width and/or the entire length of the butterfly valve.

The hollow chambers may be interconnected, preferably at the edge, either directly or indirectly via a wall portion.

Here, the hollow chambers may have a common partition wall, in particular formed by the butterfly valve. The partition wall causes an airtight separation of both hollow spaces from one another.

Each measurement point can be connected to a transmitter, and in particular all measurement points can be connected to a common transmitter. A transmitter is a measuring transducer, which transforms one or more input variables into an output variable in accordance with a fixed relationship. The transmitter transforms the pressure signal occurring for example in the respective hollow chamber into a voltage signal.

Provided each measurement point is connected to its own transmitter, the differential pressure between the pressure prevailing in the relevant hollow chamber and the atmospheric pressure outside the flow duct is determined. If the measurement points of both hollow chambers are connected to a common transmitter, the differential pressure between the pressures prevailing in the two hollow chambers is determined.

The transmitter can be arranged in the region of the butterfly valve, in particular on or in the butterfly valve.

It is advantageous if the transmitter is connected to a controller.

It is of course possible for the controller to also be arranged in the region of the butterfly valve, in particular on or in the butterfly valve.

A particularly compact embodiment is characterized in that a drive is also arranged in the region of the butterfly valve, in particular on or in the butterfly valve. With such an embodiment, merely the power supply has to be guided from the outside to the drive.

The swivel axis can be formed as a hollow shaft.

With such an embodiment, the hollow shaft may be designed to enable at least one pressure line to pass through or may form the pressure line itself. It is conceivable for example for the hollow shaft to comprise a partition plate in the middle, such that the two ends of the hollow shaft are separated from one another in a sealed manner. The pressure signal of one hollow chamber can be conveyed via one end of the hollow shaft to a transmitter arranged outside the flow duct, and the pressure signal of the other hollow chamber can be conveyed via the other end to a transmitter arranged outside the flow duct.

Of course, the hollow shaft may also be designed to allow at least one power line to pass through or may form the power line itself. The latter embodiment is advantageous specifically if the transmitter and/or the drive is/are located on the butterfly valve. If only the transmitter is arranged on the butterfly valve, the transmitter can be connected to the controller and/or to the drive via a power supply guided through the pivot shaft.

A protractor connected to the controller can be provided in order to determine the volume flow rate in accordance with the angular position of the butterfly valve.

At least one recess can be round or formed as a slit. The surfaces of the hollow chamber are then pierced, slitted or perforated.

The two hollow chambers may be axially symmetrical.

The height of at least one hollow chamber may be constant along its length and/or its width.

The surface of the hollow chamber arranged on the onflow side when the butterfly valve is in the closed position may first have, in the open position of the butterfly valve and as viewed in the flow direction, a course corresponding to a convex curvature and then a course corresponding to a concave curvature, wherein the transition from the convex curvature into the concave curvature preferably lies in the region of the swivel axis.

The surface of the hollow chamber arranged on the flow-off side when the butterfly valve is in the closed position may first have, in the open position of the butterfly valve and as viewed in the flow direction, a course corresponding to a concave curvature and then a course corresponding to a convex curvature, wherein the transition from the concave curvature into the convex curvature preferably lies in the region of the swivel axis.

Of course, it is also possible for the height of at least one hollow chamber along its length and/or its width to decrease from the middle of the butterfly valve towards the respective edge. This decrease may be continuous or discontinuous. For example, lens-shaped cross sections of the butterfly valve are thus possible.

The swivel axis can be mounted centrally in the flow duct.

The butterfly valve can be produced from plastic or other materials, such as metal, in particular from aluminium.

It is advantageous if at least one sensor, in particular a sensor formed as an air-quality detector and/or a temperature sensor, is arranged in the region of at least one hollow chamber, preferably in the region of the onflow-side hollow chamber. The sensor can be arranged in the hollow chamber or on the surface of a hollow chamber.

It is advantageous if, as viewed in the flow direction, a flow obstacle, in particular formed in a manner similar to a wall, is arranged after at least one recess, which is located in the onflow-side hollow chamber when the butterfly valve is in the closed position. The flow obstacle can be formed for example as a wall portion protruding with respect to the surface of the butterfly valve and extending parallel to the swivel axis. The flowing medium is backed up before this flow obstacle. A greater dynamic pressure is achieved, thus resulting in a higher differential pressure signal. The recesses can be arranged arbitrarily in the onflow-side hollow chamber as a result of this embodiment, irrespectively of the course of the surface of the onflow-side hollow chamber. Due to the flow obstacles, differential pressure tapping is also possible in an open position, in which the butterfly valve is oriented parallel to the flow direction. In addition, the butterfly valve can be designed with a lower thickness, such that the flow resistance is reduced.

For fluidic and acoustic reasons, it is advantageous if the width of at least one flow obstacle reduces as viewed in the flow direction and/or if the height of at least one flow obstacle reduces as viewed in the flow direction.

Furthermore, it is advantageous if, as viewed in the flow direction, a flow obstacle, in particular formed in a manner similar to a wall, is arranged before at least one recess, which is located in the flow-off-side hollow chamber when the butterfly valve is in the closed position. The flow obstacle may for example be formed as a wall portion protruding with respect to the surface of the butterfly valve and extending parallel to the swivel axis. Due to the flow obstacle, a greater negative pressure is produced, such that a higher differential pressure signal is thus achieved. The recesses can be provided arbitrarily in the flow-off-side hollow chamber, irrespectively of the course of the surface of the flow-off-side hollow chamber. Due to the flow obstacles, differential pressure tapping is also possible in an open position, in which the butterfly valve is parallel to the flow direction. In addition, the butterfly valve can be designed with a lower thickness, such that the flow resistance is reduced.

For fluidic and acoustic reasons, it is advantageous if the width of at least one flow obstacle increases as viewed in the flow direction and/or if the height of at least one flow obstacle increases as viewed in the flow direction.

At least one flow obstacle may have a width, as viewed orthogonally to the flow direction, that is identical to, preferably greater than, the width of the recess associated with this flow obstacle.

BRIEF DESCRIPTION OF THE DRAWINGS

Exemplary embodiments of the invention illustrated in the drawings will be explained hereinafter. In the drawings.

DETAILED DESCRIPTION OF THE PREFERRED EMBODIMENT(S)

Corresponding reference signs are used in all figures for like or similar component parts.

Figure 1:
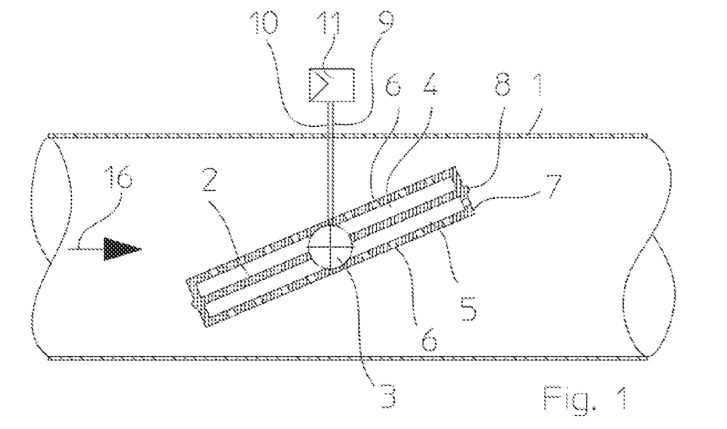
FIG. 1 shows a side view of a first exemplary embodiment of a butterfly valve according to the invention.
Figure 2:
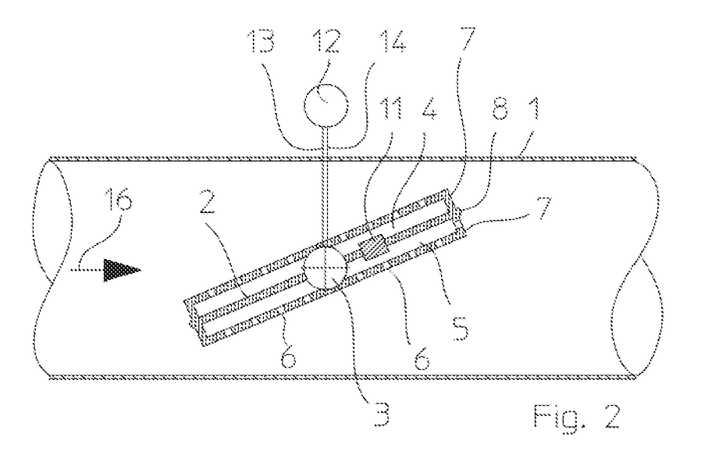
FIG. 2 shows a side view of a second exemplary embodiment of a butterfly valve according to the invention.
Figure 3:
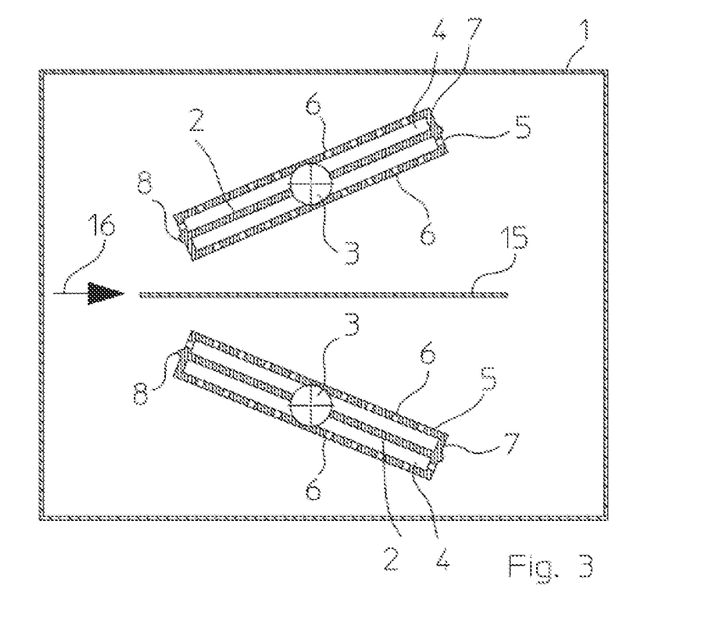
FIG. 3 shows a side view of a third exemplary embodiment of a butterfly valve according to the invention.

In the figures, a flow duct is illustrated, wherein, in the exemplary embodiments according to FIGS. 1 and 2, a butterfly valve 2 is arranged in the flow duct 1, and, in the exemplary embodiment according to FIG. 3, two butterfly valves 2 are arranged in the flow duct 1. Each butterfly valve 2 is mounted rotatably about a swivel axis 3.

Each butterfly valve 2 comprises on each of its two butterfly valve faces a hollow chamber 4, 5 respectively. The surface of each hollow chamber 4, 5 is provided with a multiplicity of recesses 6 formed in the manner of a perforation. Each hollow chamber 4, 5 extends over the entire width and the entire length of the respective butterfly valve 2.

In the exemplary embodiments illustrated, the hollow chambers 4, 5 of each butterfly valve 2 are interconnected directly via a peripheral wall portion 7, which is interrupted by the butterfly valve 2. Each hollow chamber 4, 5 is sealed with respect to the butterfly valve 2 by means of a peripheral seal 8. The hollow chambers 4, 5 of a butterfly valve 2 therefore have a common partition wall formed by the butterfly valve 2.

In addition, a device for determining the volume flow rate of the medium flowing in the flow channel 1 is provided and, in the exemplary embodiment illustrated, comprises two measurement points. One measurement point is in one hollow chamber 4 and the other measurement point is in the other hollow chamber 5.

In the exemplary embodiment according to FIGS. 1 and 2, each swivel axis 3 is formed as a hollow shaft. Each measurement point is connected to a transmitter 11 via a pressure line 9, 10.

In the exemplary embodiment according to FIG. 1, the transmitter 11 is arranged outside the flow duct 1. In the exemplary embodiment illustrated, the transmitter 11 also comprises a controller. The transmitter 11 and the controller are connected to a drive (not illustrated). In the exemplary embodiment according to FIG. 1, the pressure lines 9, 10 are guided outwardly to the transmitter 11 through the swivel axis 3.

In FIG. 2, an exemplary embodiment is illustrated in which the transmitter 11 and the controller are arranged on the butterfly valve 2. The drive 12 connected to the transmitter 11 and to the controller is arranged outside the flow duct 1. The transmitter 11 and the controller are connected to the drive 12 via power lines 13, 14. In the exemplary embodiment according to FIG. 2, the power lines 13, 14 are guided outwardly through the swivel axis 3.

In the exemplary embodiment according to FIG. 3, two butterfly valves 2 are arranged in the flow duct 1, wherein a partition wall 15 is provided between both butterfly valves 2. In the exemplary embodiment illustrated, the flow duct 1 has a square flow cross section. The transmitter 11, the controller, and the drive 12 for each butterfly valve 2 are not illustrated for reasons of clarity.

If a gaseous medium flows in the direction of the arrow 16, an overpressure is produced in the onflow-side hollow chamber 4 of the butterfly valve 2 and a negative pressure is produced in the flow-off-side hollow chamber 5. The differential pressure between the onflow-side and the flow-off-side hollow chamber 4, 5 is determined in the transmitter 11 and is converted into a voltage signal. A flow velocity (actual value) can be assigned to the voltage signal in accordance with a stored characteristic curve. If the measured actual value deviates from the stored target value, a corresponding control signal is sent to the drive 12, so that the angular position of the butterfly valve 2 is changed.

Figure 4:
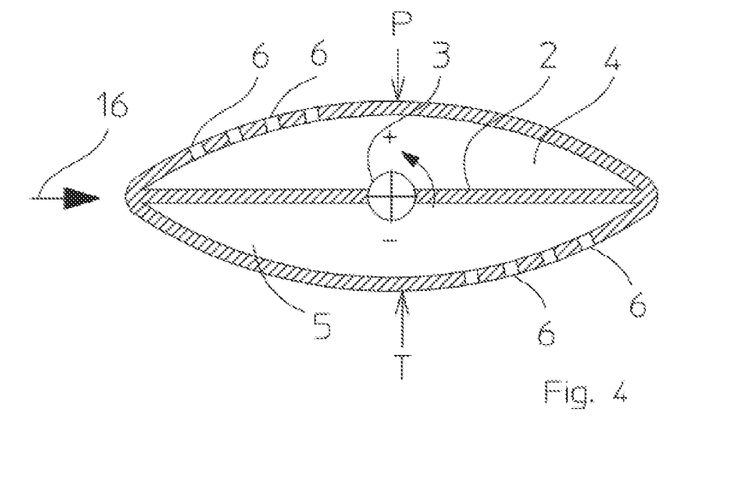
FIG. 4 shows a section through a fourth exemplary embodiment of a butterfly valve according to the invention.

An axially symmetrical butterfly valve 2 is illustrated in FIG. 4, wherein the height of both hollow chambers 4, 5 decreases from the centre of the butterfly valve 2 towards the onflow-side edge and towards the flow-off-side edge.

As can be seen in FIG. 4, all recesses 6, which are located in the onflow-side hollow chamber 4 when the butterfly valve 2 is in the closed position, are arranged in a sub-region of the region of the hollow chamber 4 forming the onflow-side end face when the butterfly valve 2 is in the open position, said sub-region, based on the cross section of the flow duct and as viewed in the flow direction 16, being arranged before the highest point P of the course of the contour of the hollow chamber 4 when the butterfly valve 2 is in the open position.

With regard to the recesses 6 in the hollow chamber 5 arranged on the flow-off side when the butterfly valve 2 is in the closed position, these are arranged in a sub-region of the region of the hollow chamber 5 forming the flow-off-side end face when the butterfly valve 2 is in the open position, said sub-region, based on the cross section of the flow duct 1 and as viewed in the flow direction 16, being arranged after the lowest point T of the course of the contour of the hollow chamber 5 when the butterfly valve 2 is in the open position.

Figure 5:
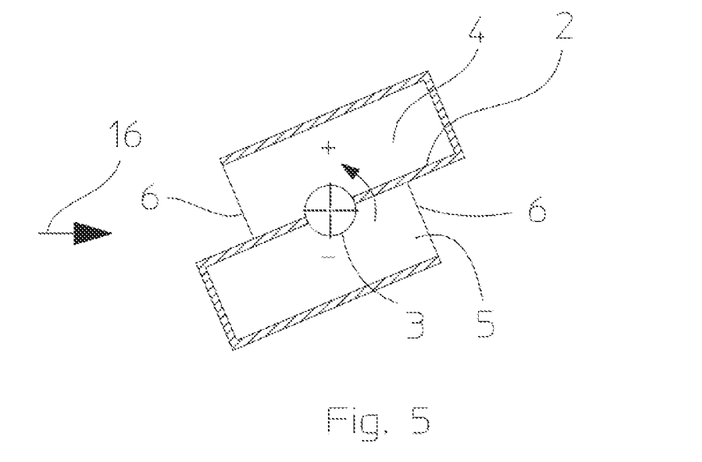
FIG. 5 shows a section through a fifth exemplary embodiment of a butterfly valve according to the invention.
Figure 6:
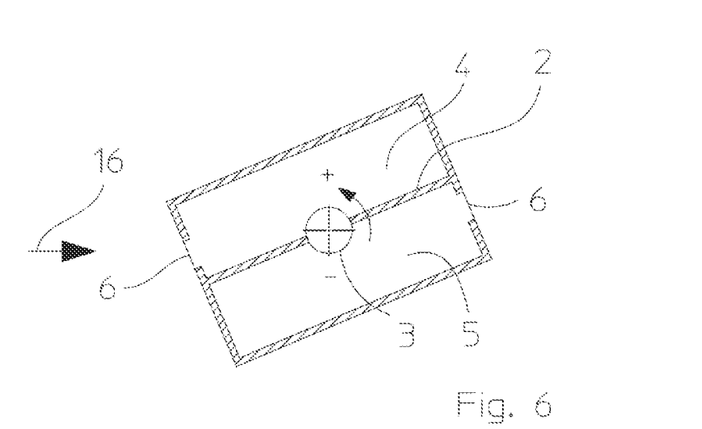
FIG. 6 shows a section through a sixth exemplary embodiment of a butterfly valve according to the invention.

An exemplary embodiment in which only one recess 6 is provided in each of the two hollow spaces 4, 5 is illustrated in FIGS. 5 and 6. With regard to the recess 6 located in the hollow chamber 4 arranged on the onflow side when the butterfly valve 2 is in the closed position, this is located in the region of the hollow chamber 4 forming the onflow-side end face when the butterfly valve 2 is in the open position.

The recess 6 in the hollow chamber 5 points in the opposite direction. The recess 6 located in the hollow chamber 5 arranged on the flow-off side when the butterfly valve is in the closed position is thus in the region of the hollow chamber 5 forming the flow-off-side end face when the butterfly valve 2 is in the open position.

In FIG. 5, the respective recess 6 forms the complete onflow-side and flow-off-side end face. In FIG. 6, each recess 6 is smaller than the respective onflow-side or flow-off-side end face.

Figure 7:
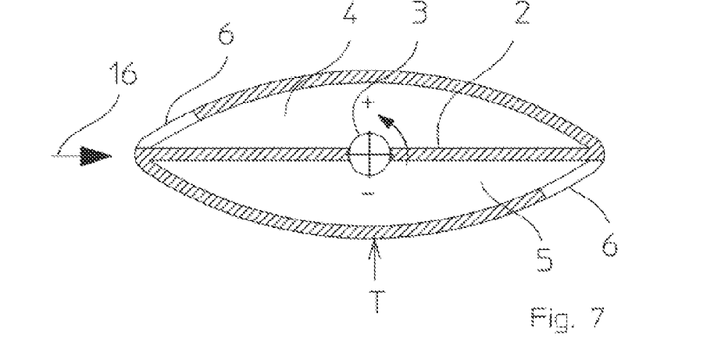
FIG. 7 shows a section through a seventh exemplary embodiment of a butterfly valve according to the invention.

In FIG. 7, an embodiment is illustrated that comprises just one recess 6 per hollow chamber 4, 5. The recess 6 in the onflow-side hollow chamber 4 is provided in the region forming the onflow-side end face when the butterfly valve 2 is in the open position. The recess 6 in the flow-off-side hollow chamber 5 is arranged in the region forming the flow-off-side end face when the butterfly valve 2 is in the open position.

Figure 8:
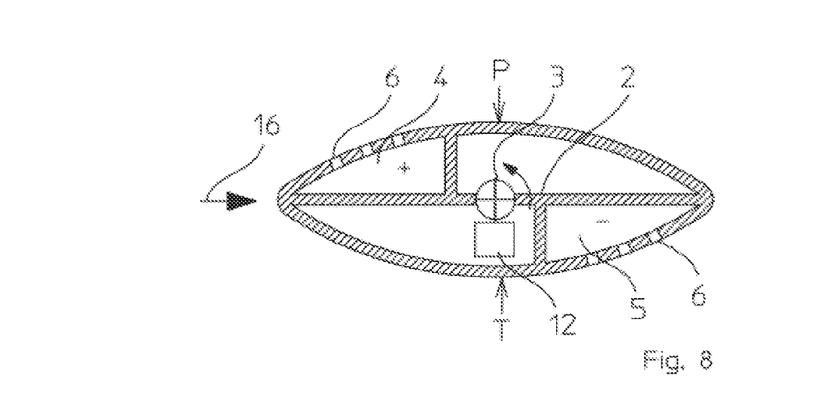
FIG. 8 shows a section through an eighth exemplary embodiment of a butterfly valve according to the invention.

The exemplary embodiment according to FIG. 8 deviates from the butterfly valve 2 according to FIG. 4 in that, with the butterfly valve 2 according to FIG. 4, each hollow chamber 4, 5 extends over the entire length of the butterfly valve 2, whereas, in FIG. 8, each hollow chamber 4, 5 extends only over a sub-region. Furthermore, a drive 12 is integrated directly into the butterfly valve 2 in the exemplary embodiment according to FIG. 8.

Figure 9:
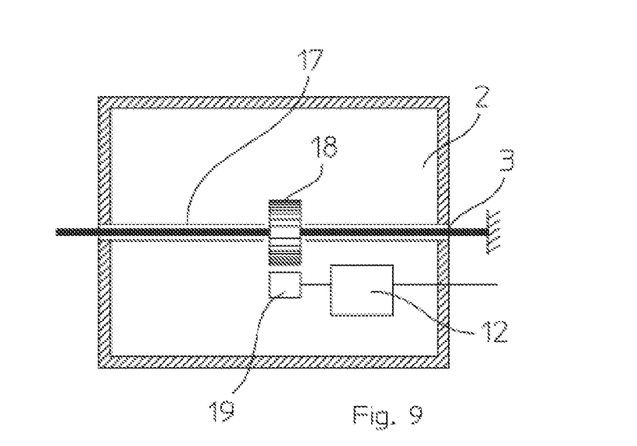
FIG. 9 shows a longitudinal section through a ninth exemplary embodiment of a butterfly valve according to the invention.

In FIG. 9, a section through a butterfly valve 2 according to the invention with an integrated drive 12 is illustrated. In the exemplary embodiment illustrated, the butterfly valve 2 consists of two halves, wherein each half comprises a partition wall. When both halves are assembled, the two partition walls contact one another, wherein the two partition walls form therebetween a recess 17 through which the swivel axis 3 can pass. The swivel axis 3 is arranged so as to be fixed against rotation with respect to the flow duct 1 (not illustrated). A gearwheel 18 is assembled on the swivel axis 3 and cooperates with a pinion 19 connected to the drive 12.

Figure 10:
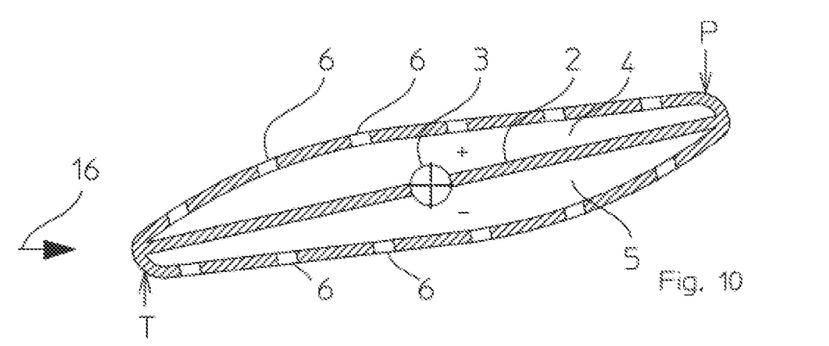
FIG. 10 shows a section through a tenth exemplary embodiment of a butterfly valve according to the invention.
Figure 11:
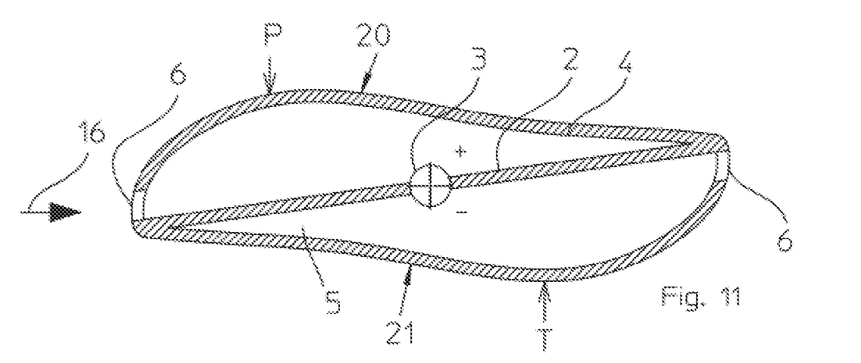
FIG. 11 shows a section through an eleventh exemplary embodiment of a butterfly valve according to the invention.
Figure 12:
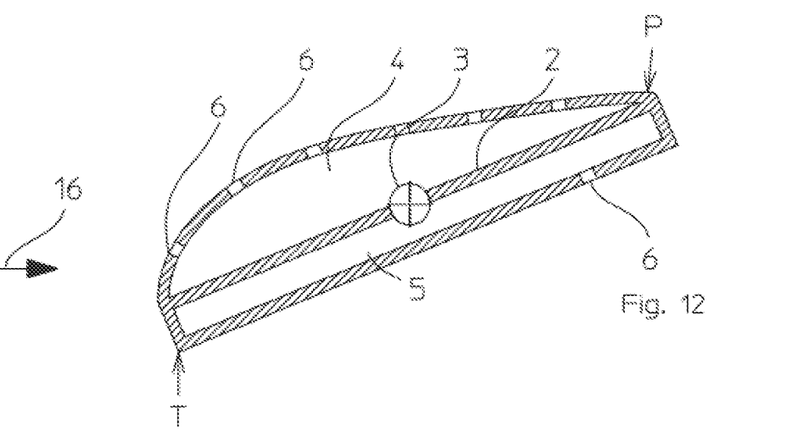
FIG. 12 shows a section through a twelfth exemplary embodiment of a butterfly valve according to the invention.

Whereas, for example in FIGS. 4, 7 and 8, a butterfly valve 2 is illustrated that is arranged parallel to the flow direction 16 in the open position, FIGS. 10 to 12 show butterfly valves 2 that in the open position are inclined with respect to the flow direction 16, that is to say are not oriented parallel to the flow direction 16 when in the open position.

For this reason, the recesses 6 in the exemplary embodiments according to FIGS. 10 and 12 may extend over the entire hollow chamber 4, since the highest point P of the course of the contour of the hollow chamber 4 is located in the region of the flow-off-side end face when the butterfly valve 2 is in the open position.

In the exemplary embodiment according to FIG. 10, the recesses 6 in the hollow chamber 5 are also arranged over the entire face of the hollow chamber 5, since the lowest point T of the course of the contour of the hollow chamber 5 is arranged in the region of the onflow-side end face when the butterfly valve 2 is in the open position.

In the exemplary embodiment according to FIG. 12, merely one recess 12 is provided in the flow-off-side hollow chamber 5.

In FIG. 11 an exemplary embodiment is illustrated, in which the surface of the hollow chamber 4 arranged on the onflow side when the butterfly valve 2 is in the closed position first has, in the open position of the butterfly valve 2 and as viewed in the flow direction 16, a course corresponding to a convex curvature and then a course corresponding to a concave curvature, wherein the transition 20 from the convex curvature into the concave curvature is arranged in the region of the swivel axis 3.

With regard to the hollow chamber 5 arranged on the flow-off side, the surface of the hollow chamber 5 arranged on the flow-off side when the butterfly valve 2 is in the closed position first has, in the open position of the butterfly valve 2 and as viewed in the flow direction 16, a course corresponding to a concave curvature and then a course corresponding to a convex curvature, wherein the transition 21 from the concave curvature into the convex curvature is arranged in the region of the swivel axis 3.

Figure 13:
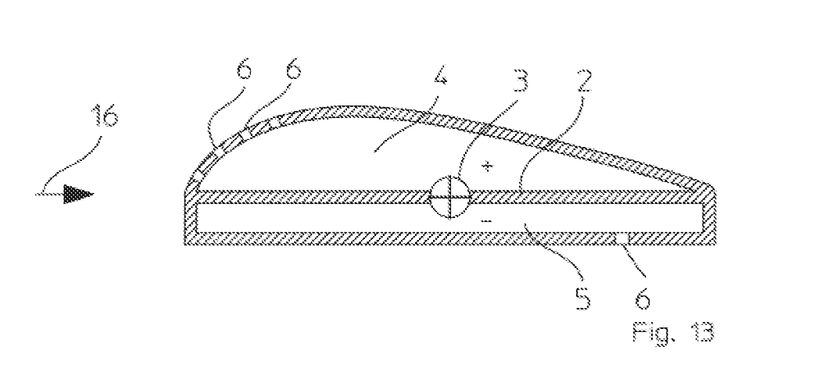
FIG. 13 shows a section through a thirteenth exemplary embodiment of a butterfly valve according to the invention.
Figure 14:
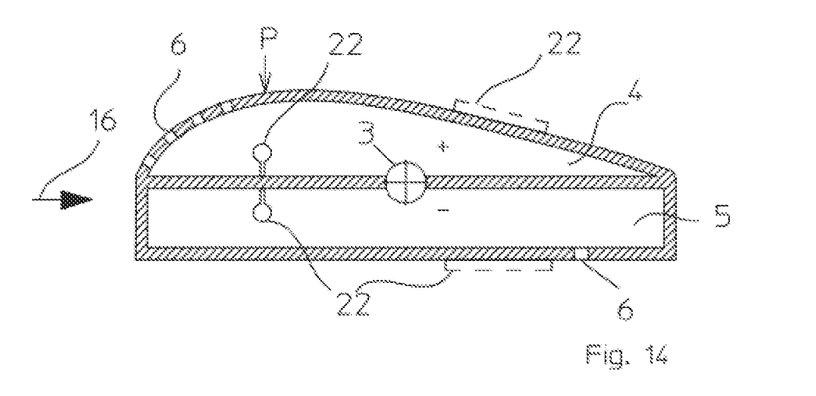
FIG. 14 shows the object according to FIG. 13 with a temperature sensor.
Figure 15:
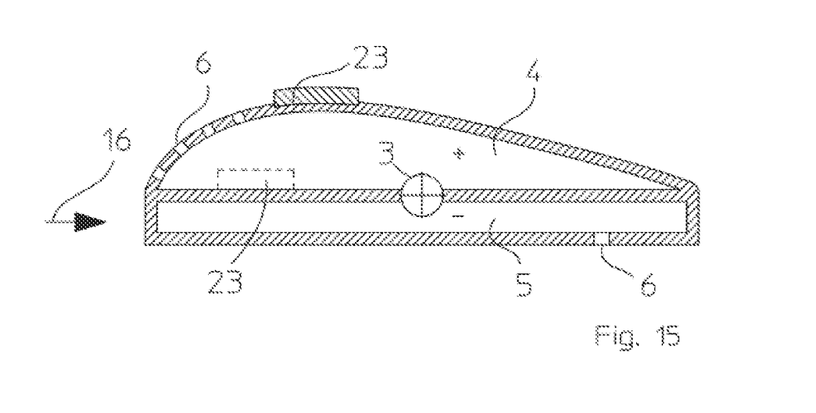
FIG. 15 shows the object according to FIG. 13 with an air-quality sensor.

Yet further exemplary embodiments are illustrated in FIGS. 13 to 15. With regard to FIG. 14, a temperature sensor 22 is provided in the onflow-side hollow chamber 4. This temperature sensor 22 may of course also be arranged in the flow-off-side hollow chamber 5 or on one of the surfaces of the hollow chambers 4, 5. These positions are illustrated in a dashed manner.

In FIG. 15, an exemplary embodiment is illustrated, in which an air-quality detector 23 is arranged on the surface of the hollow chamber 4. As illustrated in a dashed manner, this can also be arranged in the hollow chamber 4.

Figure 16:
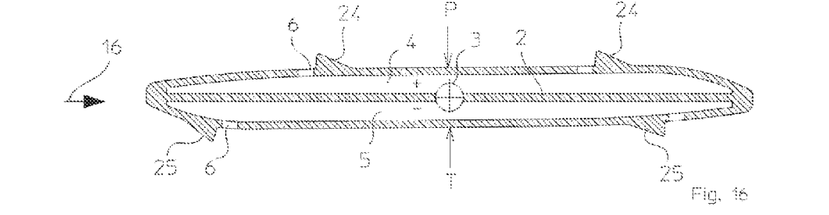
FIG. 16 shows a section through a fourteenth exemplary embodiment of a butterfly valve according to the invention.
Figure 17:
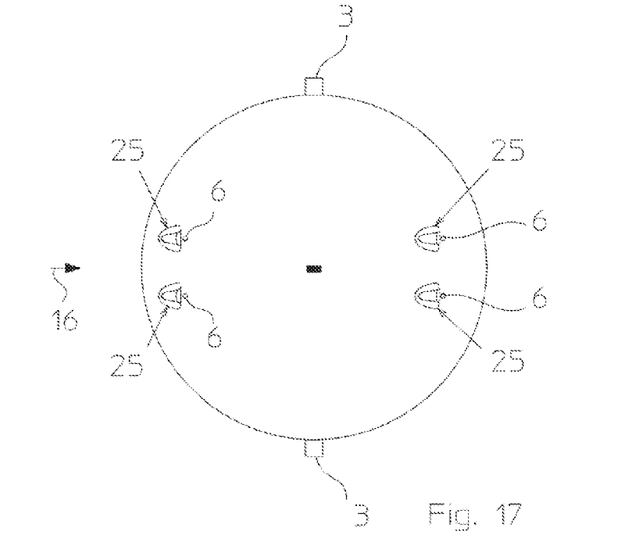
FIG. 17 shows a view from below of the object according to FIG. 16.
Figure 18:
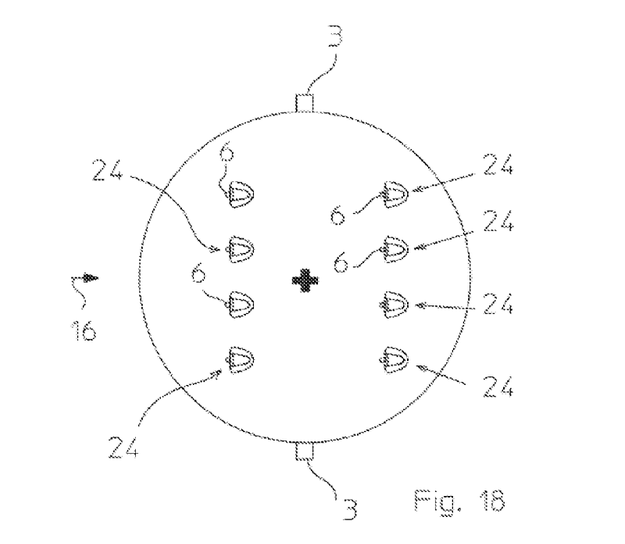
FIG. 18 shows a view from above of the object according to FIG. 16.

A further exemplary embodiment of an axially symmetrical butterfly valve 2 is illustrated in FIGS. 16 to 18. The height of both hollow chambers 4, 5, in each case decreases from the centre of the butterfly valve 2 towards the onflow-side edge and towards the flow-off-side edge.

As can be seen in FIG. 16, a plurality of recesses 6 are provided both in the onflow-side hollow chamber 4 and in the flow-off-side hollow chamber 5. In the illustrated open position, the butterfly valve 2 is oriented parallel to the flow direction 16.

The recesses 6 in the onflow-side hollow chamber 4 are located on the one hand in the sub-region that, based on the cross section of the flow duct 1 in the open position and as viewed in the flow direction 16, is arranged before the highest point P of the course of the contour of the hollow chamber 4 when the butterfly valve 2 is in the open position. On the other hand, recesses 6 are also located however in the onflow-side hollow chamber 4 in the sub-region that, based on the cross section of the flow duct 1 in the open position and as viewed in the flow direction 16, is arranged after the highest point P of the course of the contour of the hollow chamber 4 when the butterfly valve 2 is in the open position.

The same is true with regard to the recesses 6 in the hollow chamber 5 arranged on the flow-off side when the butterfly valve 2 is in the closed position. The recesses 6 are thus located on the one hand in a sub-region of the hollow chamber 5, said sub-region, based on the cross section of the flow duct 1 in the open position and as viewed in the flow direction 16, being arranged after the lowest point T of the course of the contour of the hollow chamber 5 when the butterfly valve 2 is in the open position. On the other hand, recess 6 are also located however in a sub-region of the hollow chamber 5, said sub-region, based on the cross section of the flow duct 1 in the open position and as viewed in the flow direction 16, being arranged before the lowest point T of the course of the contour of the hollow chamber 5 when the butterfly valve 2 is in the open position.

As can be seen in FIGS. 16 and 18, a flow obstacle 24 is arranged, as viewed in the flow direction 16, after each recess 6 located in the hollow chamber 4 arranged on the onflow side when the butterfly valve 2 is in the closed position. The flowing air backs up in the region of each flow obstacle 24. As is illustrated in FIG. 18, the width of each flow obstacle 24 reduces as viewed in the flow direction 16, and the height of each flow obstacle 24 also reduces as viewed in the flow direction 16. Each flow obstacle 24 thus has the shape of a wedge that tapers as viewed in the flow direction 16.

In the case of the recesses 6 in the region of the hollow chamber 5 arranged on the flow-off side, a flow obstacle 25 is arranged before each recess 6 as viewed in the flow direction. As is illustrated in FIG. 17, the width of each flow obstacle 25 increases in the flow direction 16, and the height of each flow obstacle 25 also increases in the flow direction 16. Each flow obstacle 25 thus has the shape of a wedge that tapers as viewed against the flow direction 16.

In the exemplary embodiment illustrated, the flow obstacles 24, 25 have a greater width as viewed orthogonally with respect to the flow direction compared to the width of the recess 6 associated with each flow obstacle 24 or 25.

Due to the construction according to FIGS. 16 to 18, a much flatter butterfly valve 2 can be produced, for example compared to the exemplary embodiment according to FIG. 4. In addition, the recesses 6 can be arranged arbitrarily due to the flow obstacles 24 and 25. The butterfly valve 2 can be oriented parallel to the flow direction 16 in its open position. Differential pressure tapping is also possible in this open position due to the flow obstacles 24 and 25.

It will be apparent to one of ordinary skill in the art that various modifications and variations can be made in construction or configuration of the present invention without departing from the scope or spirit of the invention. Thus, it is intended that the present invention cover all such modifications and variations, and as may be applied to the central features set forth above.

We claim:

1. Butterfly valve (2) for arrangement in a flow duct (1) of an air-conditioning installation, the butterfly valve (2) comprising two butterfly valve faces and being mounted rotatably about a swivel axis (3), and a device with at least two measurement points for determining the volume flow rate of a gaseous medium flowing in the flow duct being provided, characterized in that the butterfly valve (2) comprises at least one hollow chamber (4, 5) on each of its two butterfly valve faces, each hollow chamber (4, 5) being provided with at least one recess (6), preferably with a multiplicity of recesses (6) formed in the manner of a perforation, and one measurement point being associated with one hollow chamber (4 or 5) and the other measurement point being associated with the other hollow chamber (5 or 4).

2. Butterfly valve (2) according to claim 1, characterized in that at least one of the recesses (6) located in an onflow-side hollow chamber (4) when the butterfly valve (2) is in the closed position is arranged in the region of the hollow chamber (4) forming an onflow-side end face when the butterfly valve (2) is in the open position, and/or in that at least one of the recesses (6) located in a flow-off- side hollow chamber (5) when the butterfly valve (2) is in the closed position is arranged in the region of the hollow chamber (5) forming a flow-off-side end face when the butterfly valve (2) is in the open position.

3. Butterfly valve (2) according to claim 1, characterized in that all recesses (6) located in an onflow-side hollow chamber (4) when the butterfly valve (2) is in the closed position are arranged in a sub-region of the region of the hollow chamber (4) forming an onflow-side end face when the butterfly valve (2) is in the open position, said sub-region, based on the cross section of the flow duct (1) and as viewed in the flow direction (16), being arranged before the highest point P of the course of the contour of the onflow-side hollow chamber (4) when the butterfly valve (2) is in the open position, and/or all recesses (6) located in a flow-off-side hollow chamber (5) when the butterfly valve (2) is in the closed position are arranged in the sub-region of the region of the flow-off-side hollow chamber (5) forming a flow-off-side end face when the butterfly valve (2) is in the open position, said sub-region, based on the cross section of the flow duct (1) and as viewed in the flow direction (16), being arranged after the lowest point T of the course of the contour of the flow-off-side hollow chamber (5) when the butterfly valve (2) is in the open position.

4. Butterfly valve (2) according to claim 1, characterized in that at least one hollow chamber (4, 5) extends over the entire width and/or the entire length of the butterfly valve (2).

5. Butterfly valve (2) according to claim 1, characterized in that the hollow chambers (4, 5) are interconnected, preferably at the edge, either directly or indirectly via a wall portion (7).

6. Butterfly valve (2) according to claim 1, characterized in that the hollow chambers (4, 5) have a common partition wall, in particular formed by the butterfly valve (2).

7. Butterfly valve (2) according to claim 1, characterized in that each measurement point is connected to a transmitter (11), and in particular all measurement points are connected to a common transmitter (11).

8. Butterfly valve (2) according to claim 7, characterized in that the transmitter (11) is arranged in the region of the butterfly valve (2), in particular on the butterfly valve (2).

9. Butterfly valve (2) according to claim 7, characterized in that the transmitter (11) is connected to a controller.

10. Butterfly valve (2) according to claim 9, characterized in that the controller is arranged in the region of the butterfly valve (2), in particular on the butterfly valve (2).

11. Butterfly valve (2) according to claim 1, characterized in that a drive (12) is arranged in the region of the butterfly valve (2), in particular on the butterfly valve (2).

12. Butterfly valve (2) according to claim 1, characterized in that the swivel axis (3) is formed as a hollow shaft.

13. Butterfly valve (2) according to claim 12, characterized in that the hollow shaft is designed to enable at least one pressure line (9, 10) to pass through or forms the pressure line (9, 10) itself.

14. Butterfly valve (2) according to claim 12, characterized in that the hollow shaft is designed to enable at least one power line (13, 14) to pass through or forms the power line (13, 14) itself.

15. Butterfly valve (2) according to claim 9, characterized in that a protractor connected to the controller is provided in order to determine the volume flow rate in accordance with the angular position of the butterfly valve (2).

16. Butterfly valve (2) according to claim 1, characterized in that at least one recess (6) is round or is formed as a slit.

17. Butterfly valve (2) according to claim 1, characterized in that the two hollow chambers (4, 5) are axially symmetrical.

18. Butterfly valve (2) according to claim 1, characterized in that the height of at least one hollow chamber (4, 5) is constant along its length and/or its width.

19. Butterfly valve (2) according to claim 2, characterized in that the surface of the hollow chamber (4) arranged on the onflow side when the butterfly valve (2) is in the closed position first has, in the open position of the butterfly valve (2) and as viewed in the flow direction (16), a course corresponding to a convex curvature and then a course corresponding to a concave curvature, and/or the surface of the hollow chamber (5) arranged on the flow-off side when the butterfly valve (2) is in the closed position first has, in the open position of the butterfly valve (2) and as viewed in the flow direction (16), a course corresponding to a concave curvature and then a course corresponding to a convex curvature.

20. Butterfly valve (2) according to claim 1, characterized in that the height of at least one hollow chamber (4, 5) along its length and/or its width decreases from the middle of the butterfly valve (2) towards the respective edge.

21. Butterfly valve (2) according to claim 1, characterized in that at least one sensor, in particular a sensor formed as an air-quality detector (23) and/or a temperature sensor (22), is arranged in the region of at least one hollow chamber (4, 5), preferably in the region of the onflow-side hollow chamber (4).

22. Butterfly valve (2) according to claim 2, characterized in that, as viewed in the flow direction (16), a flow obstacle (24) is arranged after at least one recess (6), which is located in the onflow-side hollow chamber (4) when the butterfly valve (2) is in the closed position.

23. Butterfly valve (2) according to claim 22, characterized in that the width of at least one flow obstacle (24) reduces as viewed in the flow direction (16).

24. Butterfly valve (2) according to claim 22, characterized in that the height of at least one flow obstacle (24) reduces as viewed in the flow direction (16).

25. Butterfly valve (2) according to claim 2, characterized in that, as viewed in the flow direction (16), a flow obstacle (25) is arranged before at least one recess (6), which is located in the off-flow-side hollow chamber (5) when the butterfly valve (2) is in the closed position.

26. Butterfly valve (2) according to claim 25, characterized in that the width of at least one flow obstacle (25) increases as viewed in the flow direction (16).

27. Butterfly valve (2) according to claim 25, characterized in that the height of at least one flow obstacle (25) increases as viewed in the flow direction (16).

28. Butterfly valve (2) according to claim 22, characterized in that at least one flow obstacle (24, 25) has a width, as viewed orthogonally with respect to the flow direction (16), that is identical to, preferably greater than, the width of the recess (6) associated with this flow obstacle (24, 25).

* * * * *